(12) United States Patent
Tang et al.

(10) Patent No.: US 8,559,726 B2
(45) Date of Patent: Oct. 15, 2013

(54) IMAGE ANALYSIS BASED ON PIXEL BRIGHTNESS GROUPING

(75) Inventors: Feng Tang, Santa Cruz, CA (US); Suk Hwan Lim, Foster City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 13/059,925

(22) PCT Filed: Sep. 3, 2008

(86) PCT No.: PCT/US2008/075128
§ 371 (c)(1),
(2), (4) Date: Feb. 18, 2011

(87) PCT Pub. No.: WO2010/021633
PCT Pub. Date: Feb. 25, 2010

(65) Prior Publication Data
US 2011/0142350 A1    Jun. 16, 2011

Related U.S. Application Data

(60) Provisional application No. 61/091,085, filed on Aug. 22, 2008.

(51) Int. Cl.
G06K 9/46    (2006.01)
G06K 9/66    (2006.01)
G06K 9/56    (2006.01)

(52) U.S. Cl.
USPC .......................... 382/195; 382/190; 382/205

(58) Field of Classification Search
None
See application file for complete search history.

(56) References Cited

U.S. PATENT DOCUMENTS

| 5,510,838 | A | 4/1996 | Yomdin et al. |
| 6,408,028 | B1 | 6/2002 | Manjunath et al. |
| 6,975,755 | B1 | 12/2005 | Baumberg |
| 7,720,289 | B2 * | 5/2010 | Porikli et al. ................. 382/195 |
| 7,912,294 | B2 * | 3/2011 | Bogoni et al. ................ 382/195 |
| 2005/0238198 | A1 | 10/2005 | Brown et al. |
| 2008/0310731 | A1 * | 12/2008 | Stojancic et al. ............. 382/195 |

FOREIGN PATENT DOCUMENTS

| CN | 1776716 A | 5/2006 |
| CN | 1933549 A | 3/2007 |
| CN | 101162524 A | 4/2008 |

* cited by examiner

*Primary Examiner* — Randolph I Chu

(57) ABSTRACT

A method and system for analyzing an image made up of a plurality of pixels includes identifying a subset of the pixels, and for each identified pixel a local patch of pixels surrounding the identified pixel is defined and the pixels in the local patch are grouped into bins. The local patch is divided into a plurality of sub-patches, and for each sub-patch the method includes determining how many pixels in each sub-patch fall into each of the bins to create an intermediate vector, and the intermediate vectors are concatenated to form a feature vector and describe the local patch.

20 Claims, 3 Drawing Sheets

IMAGE ANALYSIS BASED ON PIXEL BRIGHTNESS GROUPING

BACKGROUND

Representing an image is a fundamental problem in many image/video analysis and synthesis applications, such as 3D modeling, motion tracking, correspondence matching, image recognition/categorization/retrieval and other applications in computer vision. Image representations can be categorized as global methods and local methods. For example, an image (as a whole) can be globally represented by global intensity histogram. However, such histograms are often not distinctive enough to characterize the appearance of the image. An example of a local method is image representation through sparse local features, which decomposes an image into multiple parts or patches, and the image is described as a constellation of these local features.

In image processing and analysis, a feature generally is a piece of information that is relevant for the particular processing or analysis task. A local feature typically has two components, a detector and a descriptor. The detector identifies features for further processing and analysis. Normally, the detector only selects a small subset of highly distinctive pixels from the whole image. The descriptor characterizes the local image content of patches centered at the detected points using a feature vector. Thus, the feature detectors attempt to select stable and reliable image locations that are informative about image content and the descriptor describes the local patch in a distinctive way with a feature vector (usually a much lower dimension than the original patch). The overall usefulness of the local feature is affected by the reliability and accuracy of the detection (localization) and distinctiveness of the description.

In order to achieve reliable operation of high level applications, it is desirable to design local features such that they are invariant (robust) to various geometric and/or photometric changes. For example, some local features are designed to be invariant to camera rotation, meaning that even if the camera is rotated, the detected feature points together with their descriptions remain unchanged or undergo only slight changes.

While many known local features are designed to be invariant to many geometric changes, few of them are designed to be invariant to complex photometric changes (pixel brightness changes). However, complex (e.g. nonlinear and spatially varying) brightness changes often occur in many real scenarios. For example, image pixel intensities are affected by the locations of lighting sources, the properties of object surface reflectance, object surface normal and camera capture parameters. Variation in any of these may lead to complex pixel intensity changes in the corresponding patches between frames. Also, changes in the relative position of an object with respect to a lighting source, or even the deformation of the object itself may result in corresponding image intensity changes.

Pixel intensity changes can cause problems in high level vision applications that assume constant intensity. Many types of known motion estimation algorithms generally require the pixel intensities to remain unchanged or go through only simple changes across frames. However, in reality, changes in capture parameters can cause dramatic change to the pixel values. Some known local feature methods claim to be invariant to linear brightness changes. However, brightness changes typically are more complicated and a linear model is not sufficient in many applications. For instance, in the applications of multi-frame computational photography, multiple image frames may be captured with significantly varying capture parameters.

For these and other reasons, there is a need for the present invention.

SUMMARY

Embodiments of a method and system for analyzing an image made up of a plurality of pixels are disclosed. A subset of the pixels is identified, and for each identified pixel a local patch of pixels surrounding the identified pixel is defined and the pixels in the local patch are grouped into a number of bins. The local patch is divided into a plurality of sub-patches, and for each sub-patch the method includes determining how many pixels in each sub-patch fall into each of the bins to create an intermediate vector, which are concatenated to form a feature vector and describe the local patch.

Furthermore, by matching the (detected) local features that are invariant to brightness changes, it is possible to estimate motion between the frames and register them accurately and reliably. Once the image frames have been accurately registered, many applications such as image stabilization, image matting and dynamic range enhancement can be enabled.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
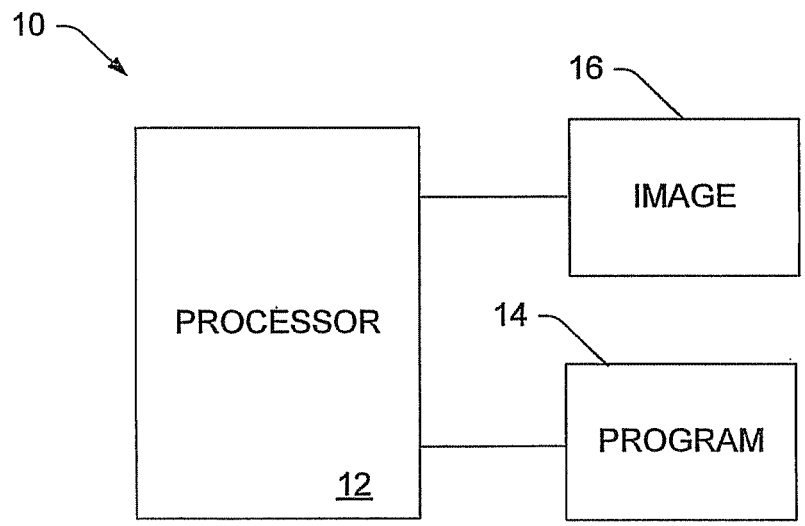
FIG. 1 is a block diagram conceptually illustrating an image analysis system in accordance with embodiments of the present invention.

FIG. 1 is a block diagram conceptually illustrating a system 10 for analyzing an image in accordance with disclosed embodiments. The system can be implemented by a computer system including an appropriately programmed processor 12. Any suitable computing or data processing environment, including in digital electronic circuitry (for example, an application-specific integrated circuit (ASIC) or a digital signal processor (DSP)) or in computer hardware, firmware, device driver, or software could be used. In some embodiments, the functionalities of the modules are combined into a single data processing component. In some embodiments, the respective functionalities of each of one or more of the modules are performed by a respective set of multiple data processing components.

A software program 14 embodying disclosed image analysis methods is accessible by the processor 12. The program 14 is contained in a storage medium that may be integral to the system 10 or located remotely and accessible over a network, for example. Storage media suitable for tangibly embodying program instructions and data include all forms of computer-readable memory, including, for example, RAM, semiconductor memory devices, such as EPROM, EEPROM, and flash memory devices, magnetic disks such as internal hard disks and removable hard disks, magneto-optical disks, DVD-ROM/RAM, and CD-ROM/RAM.

The processor 12 further has access to an image 16, which could be stored in a memory, or be provided by a camera or some other imaging device. The image 16 is made up of a plurality of pixels, and the system 10 is operable to execute an analysis method that is generally invariant to brightness changes where the only constraint is monotonically increasing or decreasing. In this disclosure, monotonically increasing means that output pixel intensities get brighter with higher input pixel intensities. In other words, if $i_a > i_b$ then $f(i_a) > f(i_b)$, with $f(\ )$ being the brightness change function (i.e., $I_{out} = f(I_{in})$). Several examples of this category are square brightness change ($I_{out} = I^2_{in}$) and square root brightness change ($I_{out} = \sqrt{I_{in}}$). Pixel intensity rankings and the location of spatial extrema of pixel intensities remain unchanged when the brightness change model is monotonic.

Figure 2:
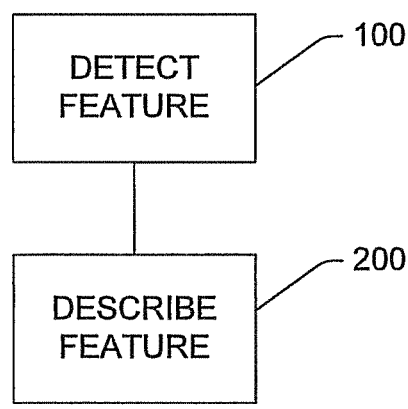
FIG. 2 is a flow diagram illustrating an image analysis method in accordance with embodiments of the present invention.

FIG. 2 very broadly illustrates the main processes included in embodiments of the disclosed analysis method, including detecting features (block 100) in an image 16 and describing the features (block 200). In exemplary embodiments, features are localized at local intensity extrema. Thus, detecting features 100 includes identifying subset of the pixels making up the image 16 that are brightness intensity extrema. In this disclosure, an intensity extremum is a point where the derivative of the intensity surface is zero at that point.

Figure 3:
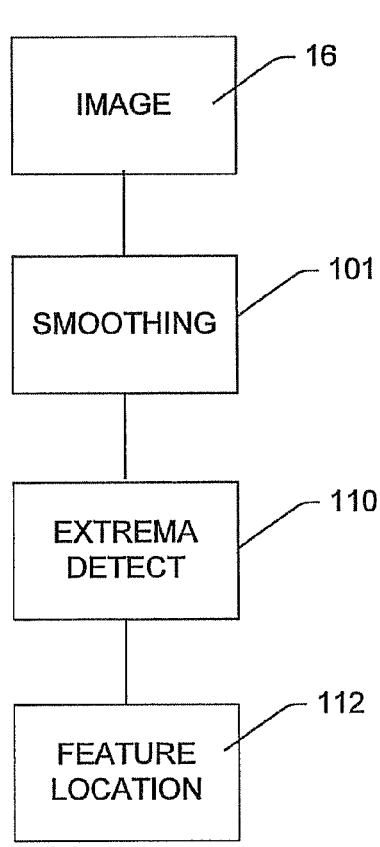
FIG. 3 is a flow diagram illustrating further aspects of the method illustrated in FIG. 2.

Accordingly, every pixel in the image is examined to see if its intensity is an extremum. In some embodiments, the pixels are examined to determine whether they are either an intensity maximum or minimum within some portion of the image, for instance, the neighborhood of the candidate pixels. This can involve comparing the pixel being examined to the other pixels in the portion of the image. For example, the portion can be a window centered at the candidate point. In certain embodiments, the portion is a 3×3 or 5×5 pixel window. The window size is a parameter that can be selected by a user depending on the particular application. In general, smaller windows will produce more detections than larger ones. The locations of pixel intensity extrema are invariant to any monotonic changes in brightness. In order to handle image noise, a pre-smoothing operation is performed before the extrema check in some embodiments. FIG. 3 illustrates further details of the feature detection process, including the pre-smoothing operation 101 and the extrema detection 110, resulting in identification of the feature locations 112.

Figure 4:
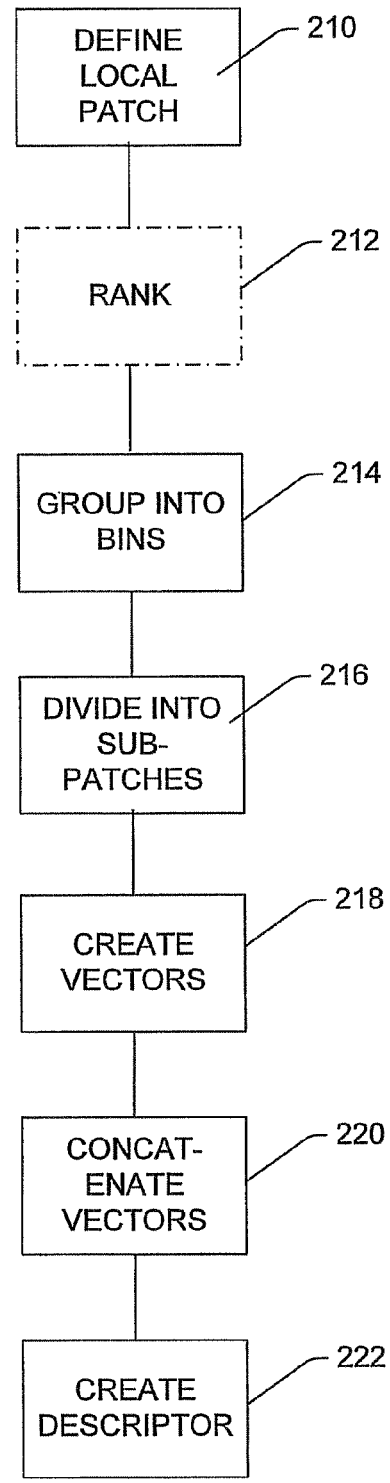
FIG. 4 is a flow diagram illustrating further aspects of the method illustrated in FIG. 2.

FIG. 4 illustrates further aspects of an embodiment of the feature description process 200. For each of the identified pixels, in block 210 a local patch is defined. In certain embodiments, the local patch includes some predefined number of pixels d surrounding the identified pixel. For example, the local patch can be rectangular having a predetermined height and width, or circular having a predetermined diameter. A rectangular or circular local patch would typically be centered on the identified pixel.

As noted previously, the rankings of the pixel intensities remain unchanged through monotonic brightness changes. However, simply ranking all of the pixels in a whole local patch and representing the patch with the complete list of rankings could produce a representation with too high a dimension (the same as the raw patch). The array of rankings can be represented using a histogram to reduce the dimensionality, but a simple histogram of the rankings of the pixels for the entire patch loses structural information and yields a trivial histogram.

The pixels in the local patch are grouped into a number of bins and each pixel in the patch is labeled with a bin number in block 214. Each bin has a predetermined number of pixels, such that the intensities of all the pixels in bin(a) are greater than or equal to those of all the pixels in bin(b) if a is greater than b. For example, if there are 400 pixels in the local patch and five bins (each with the same size), each bin will have 80 pixels and bin(i) will include pixel intensities that are ranked between (i—1)*80+1 and i*80 (i.e., bin 1: rank 1~80, bin 2: 81~160, bin 3: 161~240, bin 4: 241~320 and bin 5: 321~400). In some embodiments, the pixels in the local patch are first ranked according to the pixel brightness intensity as illustrated in block 212 before being grouped into the bins and labeled.

Figure 5:
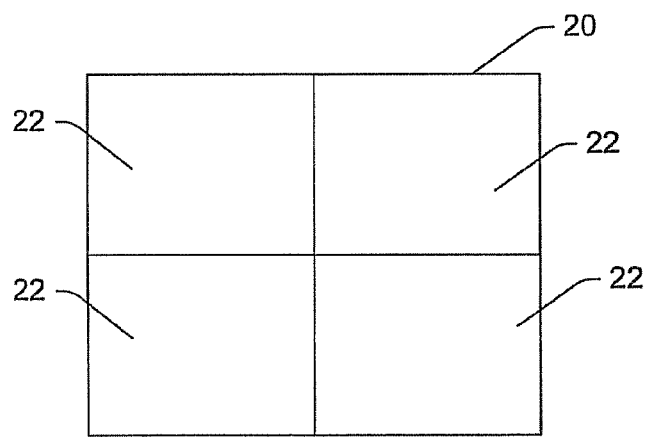
FIG. 5 illustrates an image local patch and sub-patches in accordance with embodiments of the present invention.
Figure 6:
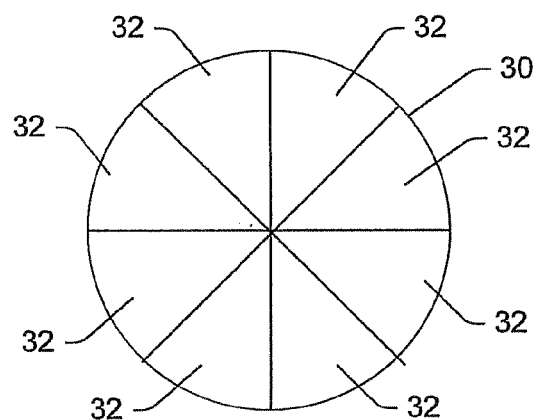
FIG. 6 illustrates another image local patch and sub-patches in accordance with embodiments of the present invention.
Figure 7:
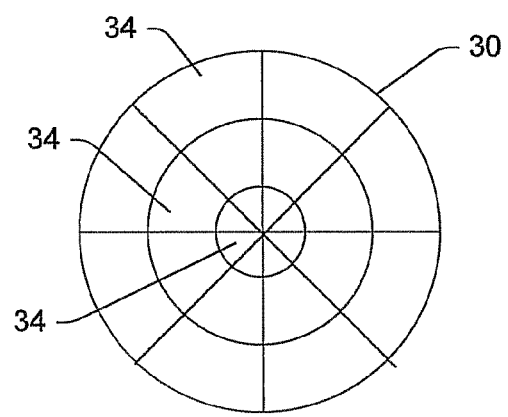
FIG. 7 illustrates another image local patch and sub-patches in accordance with embodiments of the present invention.

In order to capture the structure information within the local patch, it is divided into sub-patches in block 216, which in some embodiments have a predetermined number of pixels. As with the local patch, there are different ways to divide the sub-patches. One approach, for example, is illustrated in FIG. 5, where a rectangular local patch 20 is divided into $N_1 \times N_2$ sub-rectangles 22. Another approach, illustrated in FIG. 6, includes a circular local patch 30 having a radius d/2 centered at the detected pixel. The circular local patch 30 is angularly divided into a predetermined number of pie sections 32 to create the sub-patches. The pie sub-patch configuration can make the descriptor rotation invariant but may lose some radial information. A more sophisticated configuration based on the pie sub-patch division is to further apply a circular division and discretize the space into N sub-patches 34 as illustrated FIG. 7.

In block 218, intermediate vectors are created by determining how many pixels in each sub-patch fall into each of the bins. A histogram of brightness intensity rank for each sub-patch is built. Thus, the system 10 computes which bin (of k choices) each of the pixels in each sub-patch falls into and counts the number of pixels in each of the k bins. Note that each bin represents the range of ranks, not the range of original pixel intensity. The histogram of each sub-patch is represented by a k-dimensional intermediate vector where each dimension denotes how many of the pixels fall into a bin of ranks. In some embodiments, more weight is placed on pixels closer to the center of the local patch and less weight on the pixels further away from the center through a Gaussian weighting scheme.

After the intensity rank histogram is built for each of N sub-patches, these k-dimensional vectors are concatenated in block 220 to form an N×k dimensional vector and create the descriptor of the local patch in block 222. The order of concatenation may follow a pre-determined order. For example, the concatenation may start from the horizontal sub-patch and traverse in a counter-clockwise order. If a combination angular/circular sub-patch division configuration is used such as that illustrated in FIG. 7, then the order may follow an inside to outside path. Finally, the feature vector may be normalized by the number of pixels in the patch to make the descriptor independent of the total number of pixels in the patch.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of analyzing an image made up of a plurality of pixels, each pixel having a brightness intensity, the method comprising:
   identifying a subset of the pixels;
   for each identified pixel:
      defining a local patch of pixels surrounding the identified pixel; and
      grouping the pixels in the local patch into a number of bins based on the brightness intensities of the pixels;
      dividing the local patch into a plurality of sub-patches;
      determining, for each sub-patch, how many pixels in each sub-patch fall into each of the bins;
      creating an intermediate vector for each sub-patch based upon how many pixels in each sub-patch fall into each of the bins; and
      concatenating the intermediate vectors to form a feature vector and to describe the local patch.

2. The method of claim 1, wherein identifying the subset of the pixels includes identifying pixels that are spatially local extrema in brightness intensity.

3. The method of claim 2, wherein identifying the pixels that are spatially local extrema in brightness intensity includes identifying pixels that are brightness intensity maxima or minima within neighborhoods of candidate pixels.

4. The method of claim 3, wherein the neighborhood of one of the candidate pixels comprises a predefined array of pixels surrounding the candidate pixel.

5. The method of claim 1, wherein the local patch includes a predefined number of pixels surrounding the identified pixel.

6. The method of claim 1, wherein the local patch is rectangular.

7. The method of claim 6, wherein the rectangular local patch has a predetermined height and width.

8. The method of claim 6, wherein the local patch is divided into sub-rectangles to create the sub-patches.

9. The method of claim 1, wherein the local patch is circular.

10. The method of claim 9, wherein the local patch is angularly divided into a predetermined number of pie sections to create the sub-patches.

11. The method of claim 9, wherein the local patch is divided both angularly and circularly into a predetermined number of sections to create the sub-patches.

12. The method of claim 1, further comprising ranking the pixels in the local patch by brightness intensity.

13. The method of claim 1, wherein the feature vectors are concatenated in a predefined order.

14. A system for analyzing an image, comprising:
   a processor to:
      receive an image comprising a plurality of pixels;
      identify a subset of the pixels, each pixel having a brightness intensity;
      for each identified pixel of the subset of pixels:
         define a local patch of pixels surrounding the identified pixel;
         group the pixels in the local patch into a number of bins based on the brightness intensities of the pixels;
         divide the local patch into a plurality of sub-patches;
         determine how many pixels in each sub-patch fall into each of the bins;
         create an intermediate vector for each sub-patch based upon how many pixels in each sub-patch fall into each of the bins; and
         concatenate the intermediate vectors to form a feature vector and to describe the local patch.

15. A non-transitory computer-readable storage medium storing instructions that when executed cause a processor to:
   identify a subset of pixels of an image, each pixel having a brightness intensity;
   for each identified pixel of the subset of pixels:
      define a local patch of pixels the identified pixel; and
      group the pixels in the local patch into a number of bins based on the brightness intensities of the pixels;
      divide the local patch into a plurality of sub-patches;
      determine how many pixels in each sub-patch fall into each of the bins;
      create an intermediate vector for each sub-patch based upon how many pixels in each sub-patch fall into each of the bins; and
      concatenate the intermediate vectors to form a feature vector and to describe the local patch.

16. The non-transitory computer-readable storage medium of claim 15, wherein prior to grouping the pixels in the local patch into a number of bins, the instructions are to cause the processor to rank the pixels in the local patch by brightness intensity.

17. The non-transitory computer-readable storage medium of claim 15, wherein the bins have a predetermined number of pixels determined prior to the grouping.

18. The system of claim 14, wherein prior to grouping the pixels in the local patch into a number of bins, the processor is to rank the pixels in the local patch by brightness intensity.

19. The system of claim 14, wherein the bins have a predetermined number of pixels determined prior to the grouping.

20. The method of claim 1, wherein the bins have a predetermined number of pixels determined prior to the grouping.

* * * * *